United States Patent [19]
Beckey et al.

[11] Patent Number: 6,059,541
[45] Date of Patent: May 9, 2000

[54] AIR INLET COVER FOR PORTABLE BLOWER/VACUUM

[75] Inventors: Thomas J. Beckey, Edina; Steven R. Porter, Burnsville; Chadwick A. Shaffer, Oakdale; Steven J. Svoboda, Bloomington, all of Minn.

[73] Assignee: The Toro Company, Bloomington, Minn.

[21] Appl. No.: 09/038,365

[22] Filed: Mar. 10, 1998

[51] Int. Cl.[7] .................................................. F04B 49/00
[52] U.S. Cl. ................... 417/295; 417/234; 417/423.14; 415/121.2; 415/151
[58] Field of Search ................... 417/295, 234, 417/423.14, 423.1; 415/151, 121.2, 159; 15/344, 405

[56] References Cited

U.S. PATENT DOCUMENTS

| | | | |
|---|---|---|---|
| D. 263,547 | 3/1982 | Carsello | D32/15 |
| 3,209,988 | 10/1965 | Fox et al. | 417/423.1 |
| 4,269,571 | 5/1981 | Shikutani et al. | 417/234 |
| 4,413,371 | 11/1983 | Tuggle et al. | 15/405 |
| 4,644,606 | 2/1987 | Luerken et al. | 15/330 |
| 4,674,146 | 6/1987 | Tuggle et al. | 15/330 |
| 4,694,528 | 9/1987 | Comer et al. | 15/330 |
| 4,756,668 | 7/1988 | Gassen et al. | 416/247 |
| 4,870,714 | 10/1989 | Miner | 15/327 |
| 4,884,314 | 12/1989 | Miner | 15/344 |
| 5,423,660 | 6/1995 | Sortor | 416/189 |
| 5,560,078 | 10/1996 | Toensing et al. | 15/339 |
| 5,601,400 | 2/1997 | Kondo et al. | 415/119 |

*Primary Examiner*—Timothy S. Thorpe
*Assistant Examiner*—David J. Torrente
*Attorney, Agent, or Firm*—Mueting, Raasch & Gebhardt, P.A.

[57] ABSTRACT

An improved air inlet cover and impeller for a convertible electric blower/vacuum. The blower/vac includes an electric motor which drives an impeller. A plurality of blades located on the impeller define a frusto-conical surface of revolution. The air inlet cover includes an integral, frusto-conical pressure ring which is located offset but generally congruent to the surface of revolution defined by the impeller blades. The cover additionally includes an air grate that allows the passage of air but prevents the passage of other objects. The grate also includes a choke member for adjusting the effective area of the air inlet into the blower/vac to control the exit air volume and velocity of the blower. The cover also includes a bell-mouthed opening integral with the choke member to increase the efficiency of the blower/vac when in the blower mode.

17 Claims, 18 Drawing Sheets

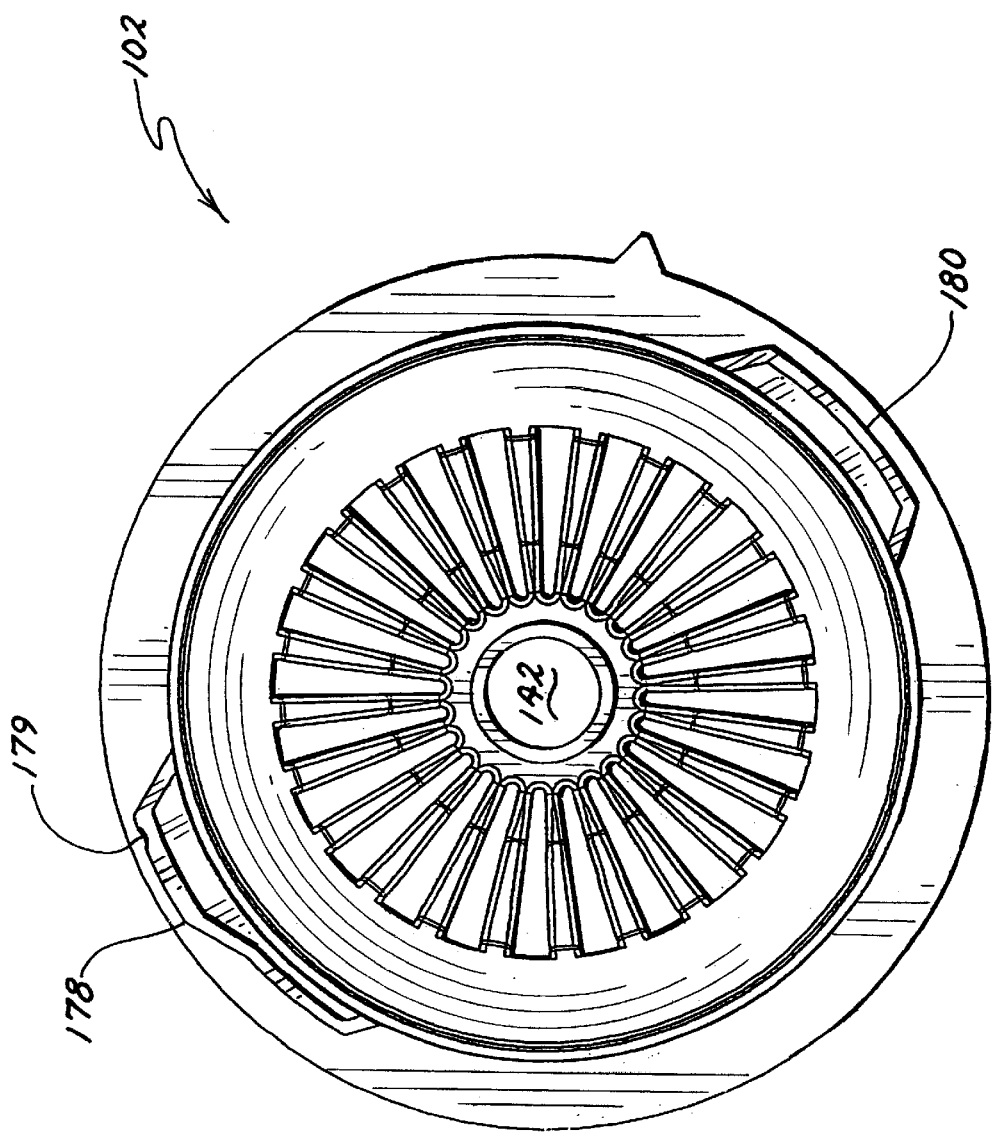

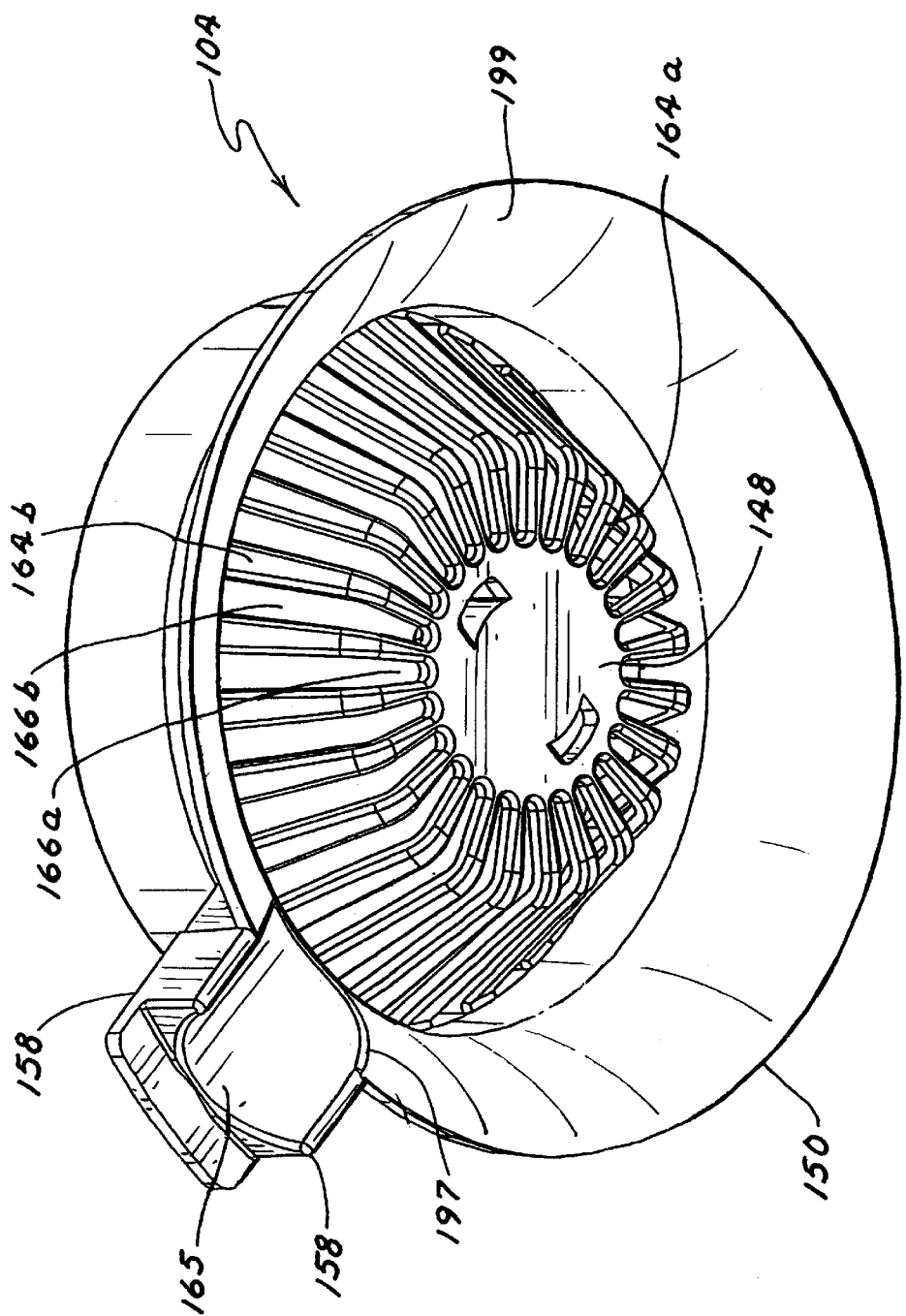

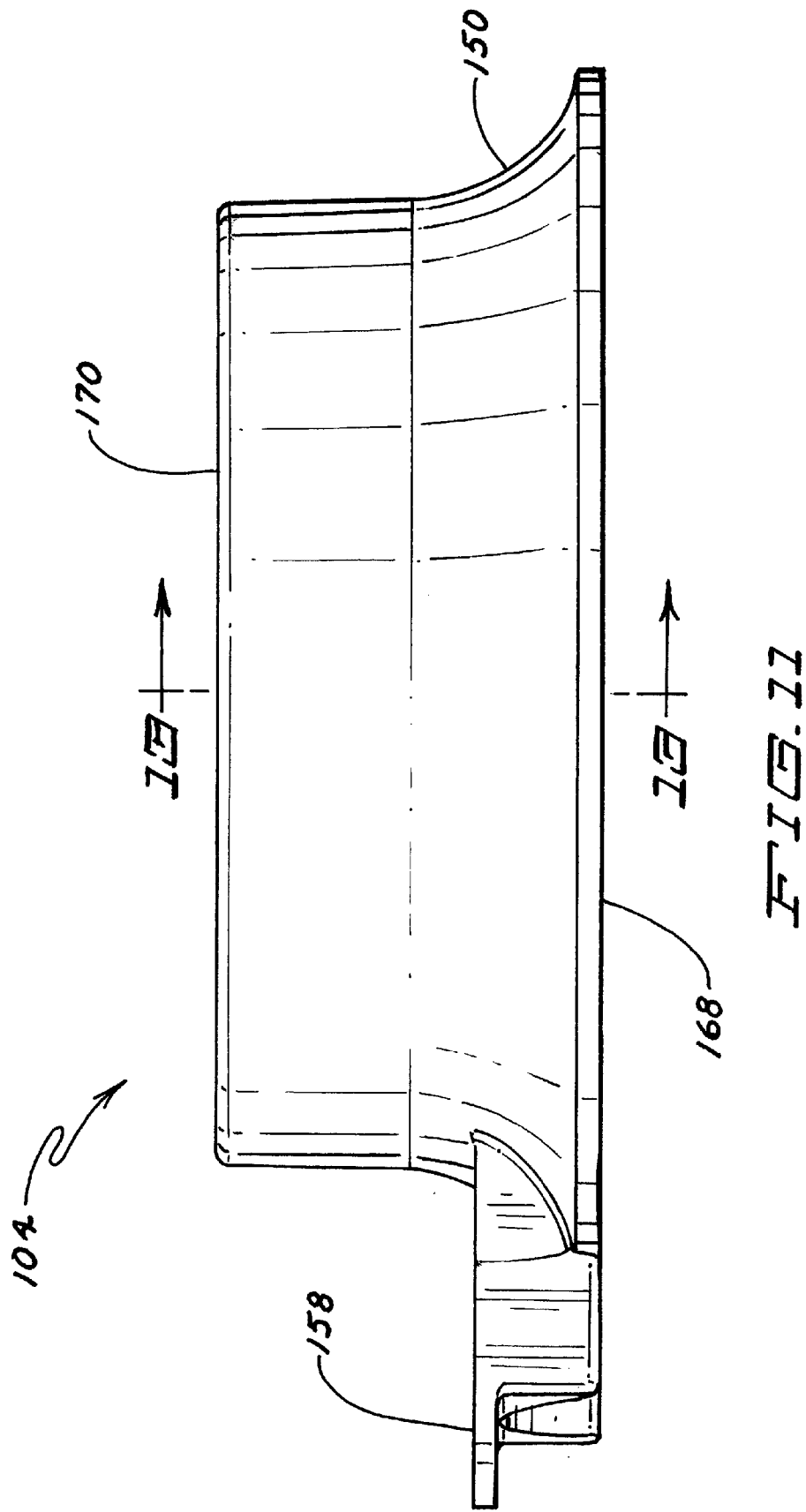

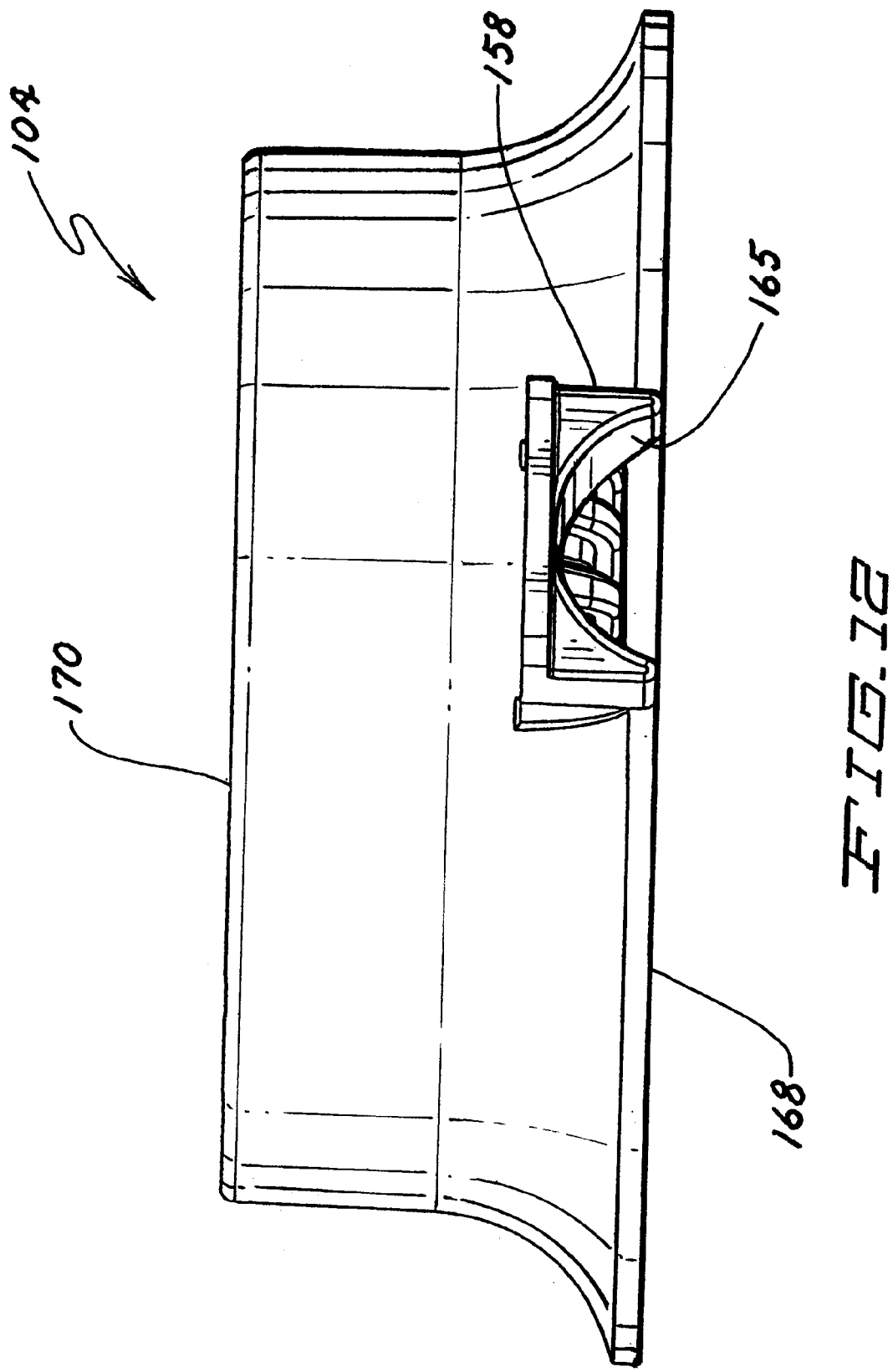

AIR INLET COVER FOR PORTABLE BLOWER/VACUUM

TECHNICAL FIELD

This invention pertains generally to air moving apparatuses. More specifically, this invention pertains to air inlet covers and impellers for portable blower/vacuums.

BACKGROUND OF THE INVENTION

Convertible blower/vacuum units (blower/vacs) are in common use by homeowners and professionals for the removal of debris from yards, driveways, and sidewalks. A convertible blower/vac is a device which can be used as a blower and can be converted to operate as a vacuum.

In blower operation, typical blower/vac units provide a sweeping action created by the production of a fast moving stream of air from a rotating impeller within a housing. The impeller draws air into the housing through an air inlet. An air inlet cover permits air to enter the housing while at the same time preventing the entrance of foreign objects and debris. An air outlet on the housing directs the air stream to a removable exhaust or blower tube. A nozzle at the outlet of the blower tube is generally smaller than the outlet on the housing of the unit, thus causing a higher velocity air stream at the nozzle and allowing for greater precision and force in blowing debris across a surface.

Conversion from the blower mode to the vacuum mode typically requires removing the blower tube and placing a debris catching vacuum bag on the outlet. The air inlet cover is removed from the air inlet and replaced with a vacuum tube. In vacuum operation, the device draws air and debris through the vacuum tube. Debris is reduced (or "mulched") as it is drawn through the impeller. The debris is ultimately propelled into the vacuum bag for disposal.

Modern units are typically hand-held and, therefore, are made of lightweight materials and utilize lightweight power sources. The two most common power sources are electric and gasoline motors.

A high degree of efficiency of the air inlet cover and the impeller is desirable. An efficient air inlet cover and impeller system delivers a higher air horsepower output per given unit of power input to the motor. This is particularly advantageous with electric blowers where electric motor size may be restricted by the nominal AC power available (e.g., 120 volt, 12 amps). Because of this, simply increasing motor size is not always a practical solution for increasing the air horsepower of electric blower/vacs. Thus, efficiency improvements elsewhere are highly desirable. The present invention relates to improvements in both the air inlet cover and the impeller in order to increase blower/vac efficiency.

Many types of blower/vacs with novel inlets and impellers are known. For example, U.S. Pat. No. 5,601,400 issued to Kondo et al. on Feb. 11, 1997 and assigned to Nippondenso Co., Ltd discloses a centrifugal blower with a bell-mouthed inlet.

U.S. Pat. No. 4,694,528 issued to Comer et al. on Sep. 22, 1987 and assigned to The Toro Company discloses a portable electric blower/vac with an air inlet cover and an impeller driven by an electric motor. The air inlet cover includes a pressure ring for increasing the efficiency of the blower/vac when the cover is placed over the air inlet opening. The pressure ring increases the efficiency of the blower by reducing air spillover between the high pressure and low pressure sides of the impeller blades during rotation of the impeller.

U.S. Pat. No. 5,560,078 issued to Toensing et al. on Oct. 1, 1996 and assigned to The Toro Company discloses a portable electric blower/vac with a removable air inlet cover. The air inlet cover includes an integral pressure ring for reducing air spillover between the high pressure and low pressure sides of the impeller blades during rotation of the impeller. The air inlet cover also includes an adjustable choke member pivotally and concentrically mounted to the air inlet cover.

U.S. Pat. No. 4,674,146 issued to Tuggle et al. on Jun. 23, 1987 and assigned to Emerson Electric Company discloses a gasoline engine powered hand-held blower. The blower/vac includes an air inlet cover that provides a tortuous pathway for incoming air to reduce the likelihood of small rocks or pebbles being ingested into the impeller when the blower/vac is placed on a surface while the impeller is rotating.

U.S. Pat. No. 4,756,668 issued to Gassen et al. on Jul. 12, 1988 and assigned to Textron Inc. discloses a blower/vac apparatus with an air intake cover. The air intake cover includes a conical wall through which are defined a multitude of openings in direct communication with the air intake opening for the impeller.

U.S. Pat. No. 4,870,714 issued to Miner on Oct. 3, 1989 and assigned to Black and Decker Inc. discloses a portable electric blower/vac. The blower/vac includes an impeller with a plurality of blades. Each blade has an inner edge that slopes downwardly and away (as installed) from the hub of the impeller and an outer edge that slopes upwardly and away from a lowermost point of the inner edge. The inner and outer edges define generally conical surfaces of revolution. The outer edges define a generally outwardly facing concave surface of revolution.

U.S. Pat. No. 4,644,606 issued to Luerken et al. on Feb. 24, 1987 and assigned to McCulloch Corporation discloses a gasoline powered hand-held blower/vac. The blower/vac includes an impeller with a series of blades. Each blade includes an inner edge that slopes downwardly and away (as installed) from the hub of the impeller, a flat central section, and an outer edge that extends upwardly and away from the central section.

Fan Engineering Handbook, copyright 1983 to the Buffalo Forge Company discloses, on pages 2-36 and 2-37, a description of the coefficient of entry and the loss coefficient for a bell-mouthed entry to an air duct system. Pages 14-2 and 14-3 disclose further characteristics of the air flow entry conditions for a bell-mouthed entrance.

The present invention pertains to a portable blower/vac with a novel air inlet cover and impeller.

SUMMARY OF THE INVENTION

The present invention includes an air inlet cover for a portable blower/vac comprising an air grate and a pressure ring. The pressure ring may be integrally formed with the air grate and the air grate, in turn, can be removably mounted over an air inlet opening of the blower/vac. The air inlet cover may also include a bell-mouthed entrance. The bell-mouthed entrance can be formed integrally with an adjustable choke member that is mounted concentrically on the air grate. The choke member can include a choke lever extending radially outward from the outer perimeter of the choke member. The choke lever provides an operator with a lever arm for pivoting the choke member between a first and a second position. The choke lever can include detent means for retaining the choke lever and the choke member in the first or second position once a desired position has been selected by the operator.

The present invention can also include a portable blower/vac with a housing having an air inlet opening and an air outlet, a motor operatively connected to the housing and an impeller affixed to an output shaft of the motor where the impeller draws air through the air inlet opening and discharges air through the air outlet. The blower/vac can also include: an air grate with an integral pressure ring, wherein the air grate is removably mounted over the air inlet opening; and an adjustable choke member permitting adjustment of the air flow rate through the air grate. The choke member can be concentrically and pivotally engaged to the air grate. The choke member may also include a bell-mouthed entrance.

The present invention can also include a portable blower/vac with a housing having an air inlet opening and an air outlet, a motor operatively connected to the housing and an impeller affixed to an output shaft of the motor where the impeller draws air through the air inlet opening and discharges air through the air outlet. The motor can be electrically powered. The impeller rotates about an axis of rotation coaxial with the rotation of the output shaft. The blower/vac includes an air inlet cover with an air entrance side through which air enters the inlet cover, an air exit side where air exits into the housing after passing through the cover, a bell-mouthed entrance on the air entrance side of the cover, and a pressure ring on the air exit side of the cover for increasing the efficiency of the impeller when the air inlet cover is engaged over the air inlet opening and wherein the pressure ring defines a frusto-conical surface. The air inlet cover may be removably mounted over the air inlet opening.

BRIEF DESCRIPTION OF THE DRAWING

This invention will be further described with reference to the appended Drawing, wherein:

FIG. 2A is a bottom plan view of the preferred blower/vac of FIG. 2;

FIG. 9 is a plan view of the air inlet grate of FIG. 5;

FIG. 10 is a perspective view of the exterior or lower side of the choke member of the air inlet cover of FIG. 1;

FIG. 11 is a side elevational view of the choke member of FIG. 10;

FIG. 12 is a side elevational view of the choke member of FIG. 10;

FIG. 13 is a cross-sectional view of the choke member taken along line 13—13 of FIG. 11 with the spokes omitted for clarity.

DETAILED DESCRIPTION OF A PREFERRED EMBODIMENT

Figure 1:
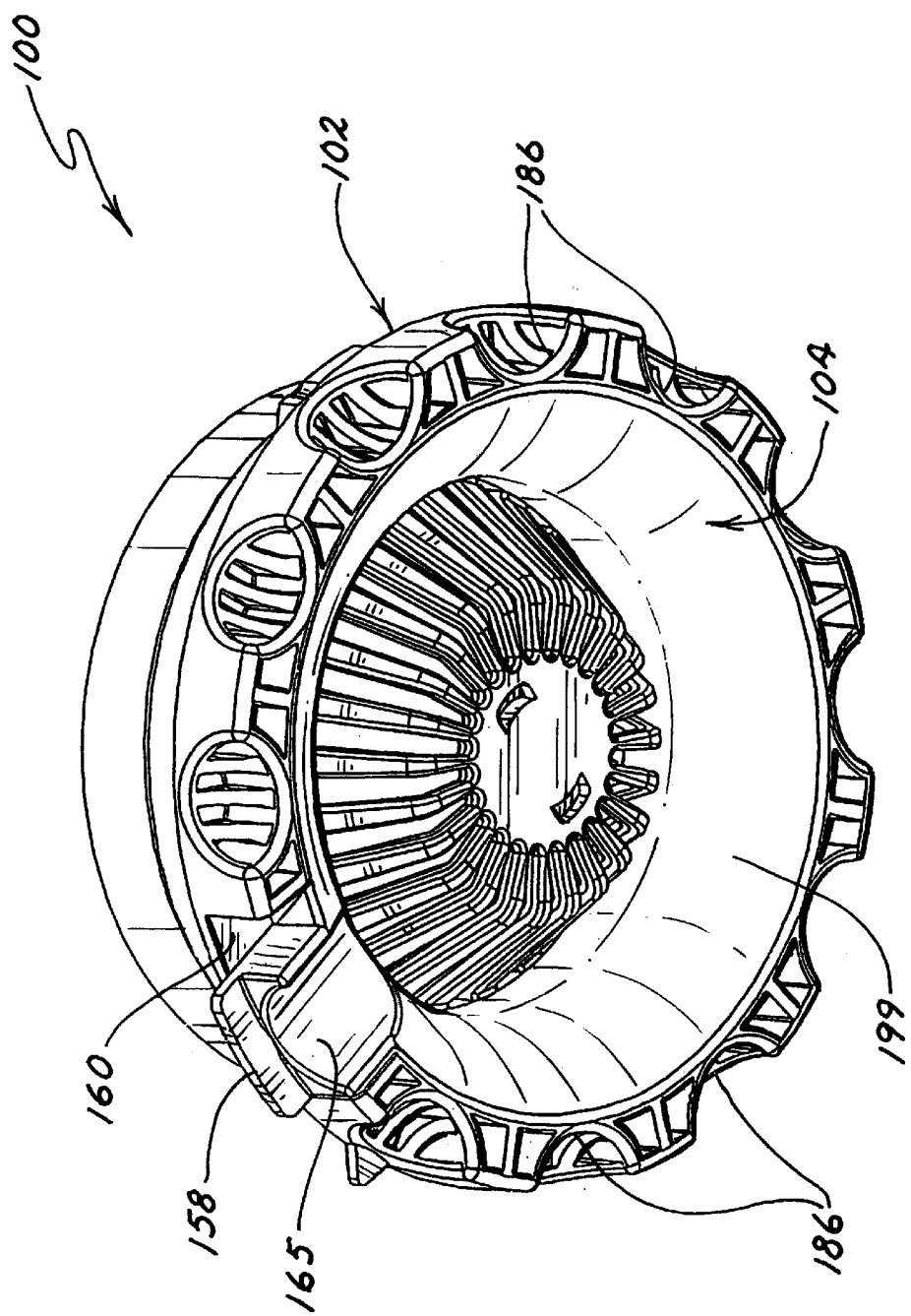
FIG. 1 is a perspective view of the exterior or air entrance side of the preferred air inlet cover of the present invention.

With reference to the Drawing, wherein like reference numerals designate like parts and assemblies throughout the several views, FIG. 1 shows a perspective view of a preferred air inlet cover 100 for use with a portable blower/vacuum. Cover 100 includes an air inlet grate 102 and a choke member 104. While the cover of the present invention is directed to electric blower/vacs, those skilled in the art will appreciate that it could be applied to other types of blower/vacs as well (e.g., gas engine-powered units, blower-only units, backpack-mounted units). In the preferred embodiment, cover 100 is removable. However, a blower/vac or blower-only unit with a non-removable cover is also within the scope of the present invention.

Figure 2:
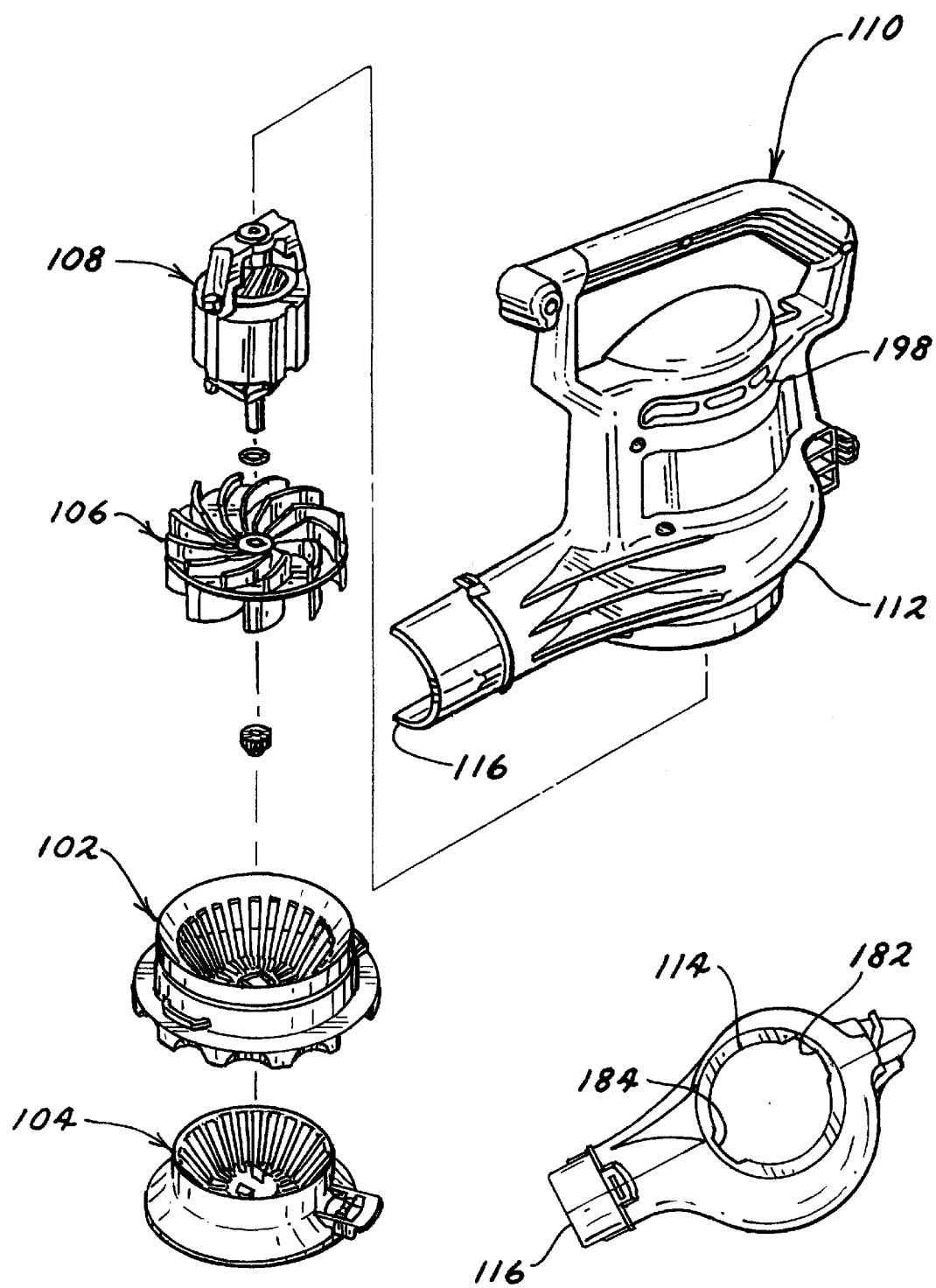
FIG. 2 is an exploded view of a preferred blower/vac assembly including the air inlet grate and choke member of the cover of FIG. 1.

Although the particular construction of the blower/vac is, for the most part, not central to the invention, the basic components will be described. Unless otherwise noted, relative directions (e.g., upward, downward) refer to the orientation of the particular part or assembly in its installed position. FIG. 2 shows an exploded view of an electric blower/vacuum 110. Blower/vac 110 comprises a housing 112 (left half shown) having an air inlet opening 114 (see FIG. 2A). In the preferred embodiment, an electric motor 108 is mounted within an interior region of housing 112. However, those skilled in the art will realize that housing 112 could easily be modified to alternatively accept an internal combustion engine. A motor output shaft extends downwardly from motor 108 in a direction that is generally perpendicular to the plane of air inlet opening 114. Operatively connected to the output shaft is an impeller 106. Impeller 106 is secured to the output shaft such that relative rotation between the impeller and the shaft is eliminated. Housing 112 additionally includes an air outlet 116. Air inlet opening 114 resides in a first plane while outlet 116 lies in a second plane that is substantially perpendicular to the first plane.

In order to receive electricity, a male electrical cord connector (not shown) protrudes outwardly from housing 112. The connector can be coupled to an extension cord (not shown) that conducts electricity from an electrical outlet (also not shown) through an electrical circuit to electric motor 108. An electrical switch (not shown) mounted to housing 112 is wired in series between motor 108 and the connector. The switch, upon operator command, opens and closes the electrical circuit for the motor. Thus, by operator manipulation of the switch, the blower/vac 110 can be selectively activated.

Figure 3:
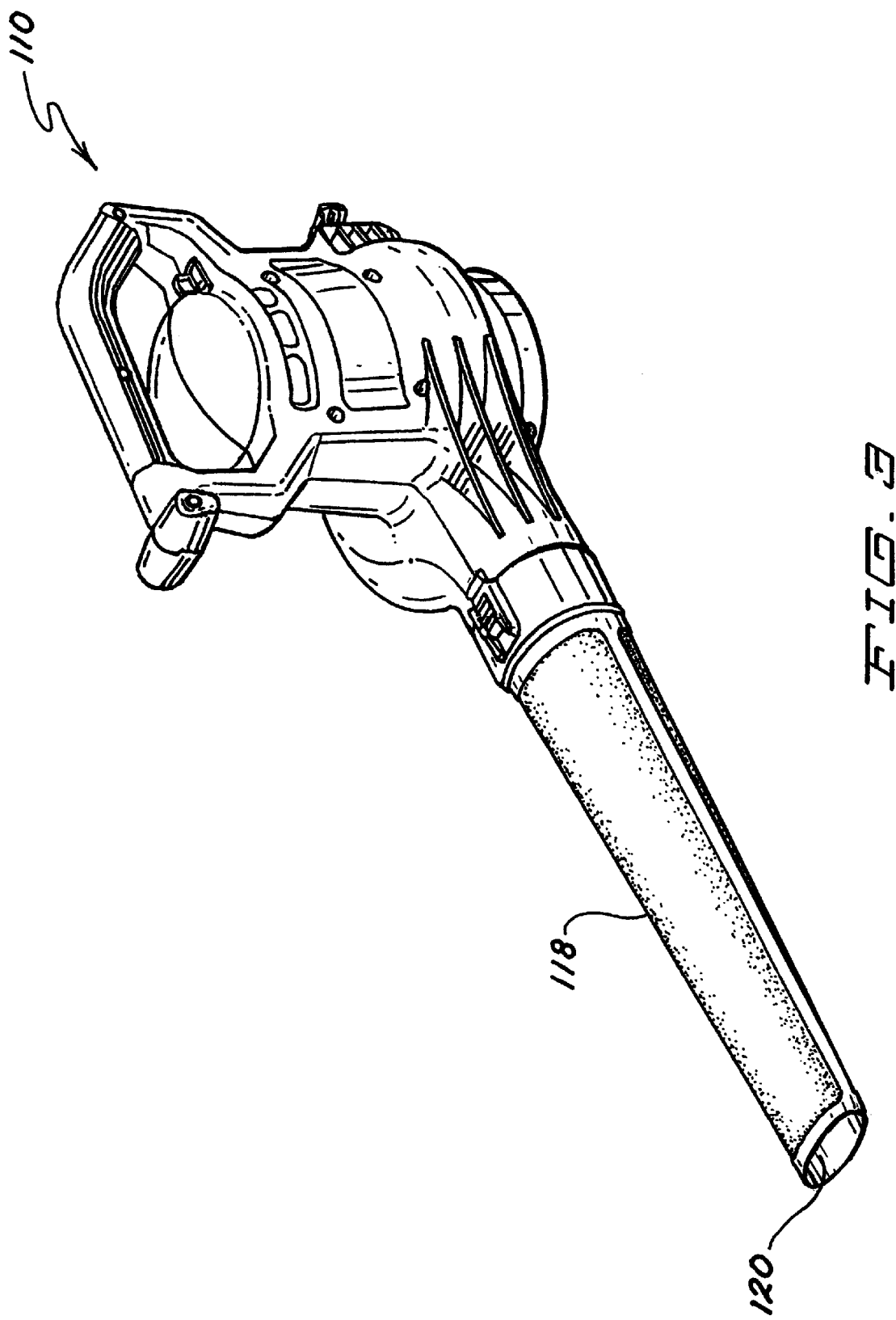
FIG. 3 is a perspective view of the preferred blower/vac configured for operation in the blower mode.
Figure 4:
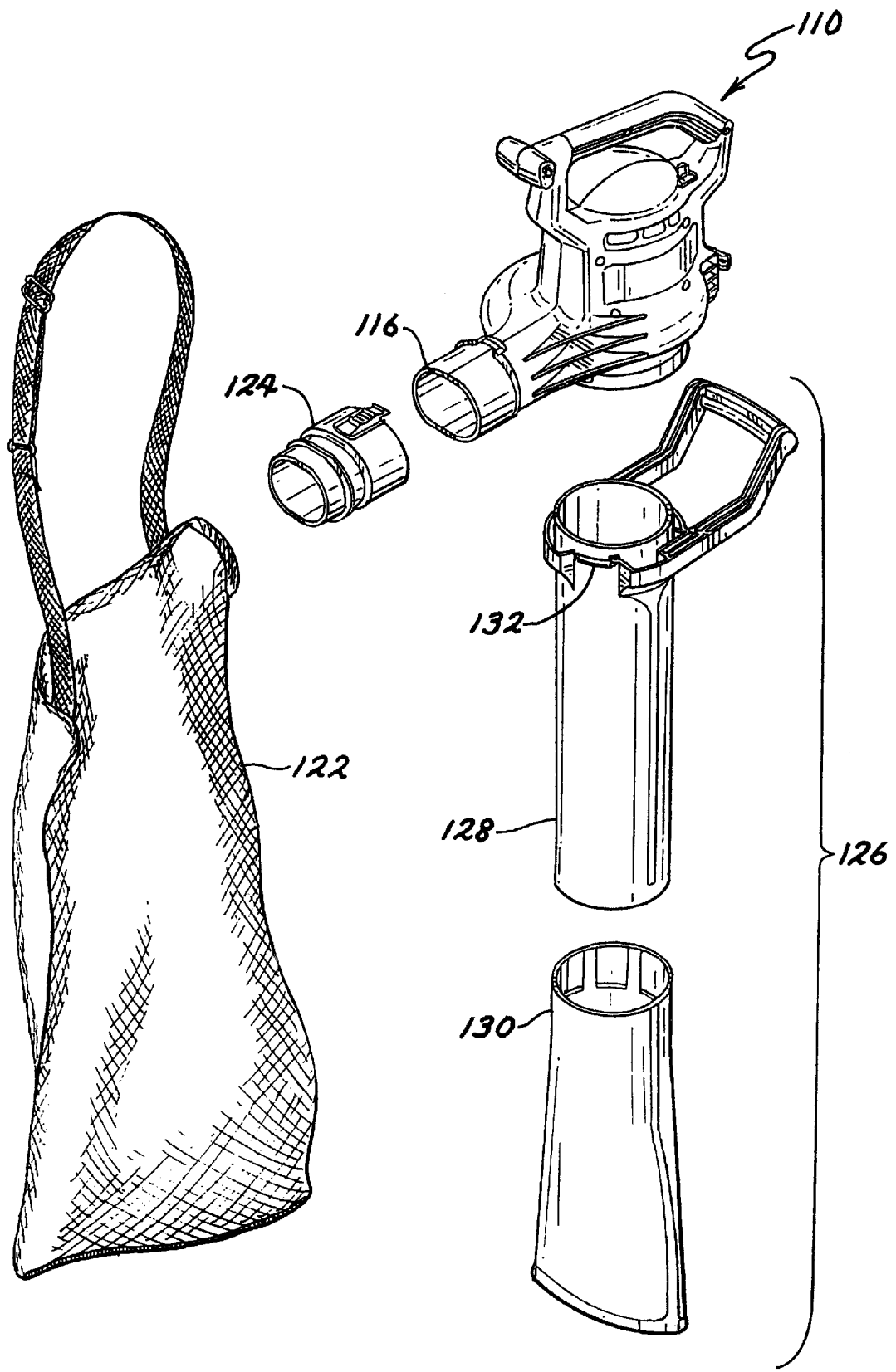
FIG. 4 is an exploded view of the preferred blower/vac configured for operation in the vacuum mode.

The blower/vac can operate in either a blower mode or a vacuum mode. When operating in the blower mode, blower/vac 110 is configured as shown in FIG. 3. That is, an outlet extension tube 118 having an outlet orifice 120 is attached to air outlet 116. When operated in vacuum mode, blower/vac 110 is configured as shown in FIG. 4. In this mode, a vacuum collection bag 122 is attached to air outlet 116 via a vacuum bag collar 124. A vacuum tube assembly 126 is then attached to air inlet opening 114 (see FIG. 2A). Vacuum tube assembly 126 comprises an upper tube 128 and a lower tube 130. Upper tube 128 includes a set of engagement members 132 for operatively engaging vacuum tube assembly 126 to blower inlet 114. Lower tube 130 may be flared to provide more effective vacuum action. When blower/vac 110 is used in vacuum mode, cover 100 is completely removed from air inlet opening 114 so that vacuum tube assembly 126 may be installed (i.e., the air inlet cover of the present invention is used only when blower/vac 110 is operating in the blower mode). Accordingly, the remainder of this discussion will focus primarily on the operation of blower/vac 110 in the blower mode.

The preferred embodiment of cover 100 shown in FIG. 1 is adapted to be removably mounted over air inlet opening 114. The primary purpose of the cover is to allow air to pass into housing 112 while preventing foreign objects (e.g., debris, fingers) from contacting rotating impeller 106. Other advantages of the preferred air inlet cover include: a safety feature which prevents activation of electric motor 108 when cover 100 is not installed; means for adjusting the effective area of inlet opening 114; and, integral means for increasing the efficiency of the blower/vac when it is operated in the blower mode. Each of these features is discussed below.

Figure 5:
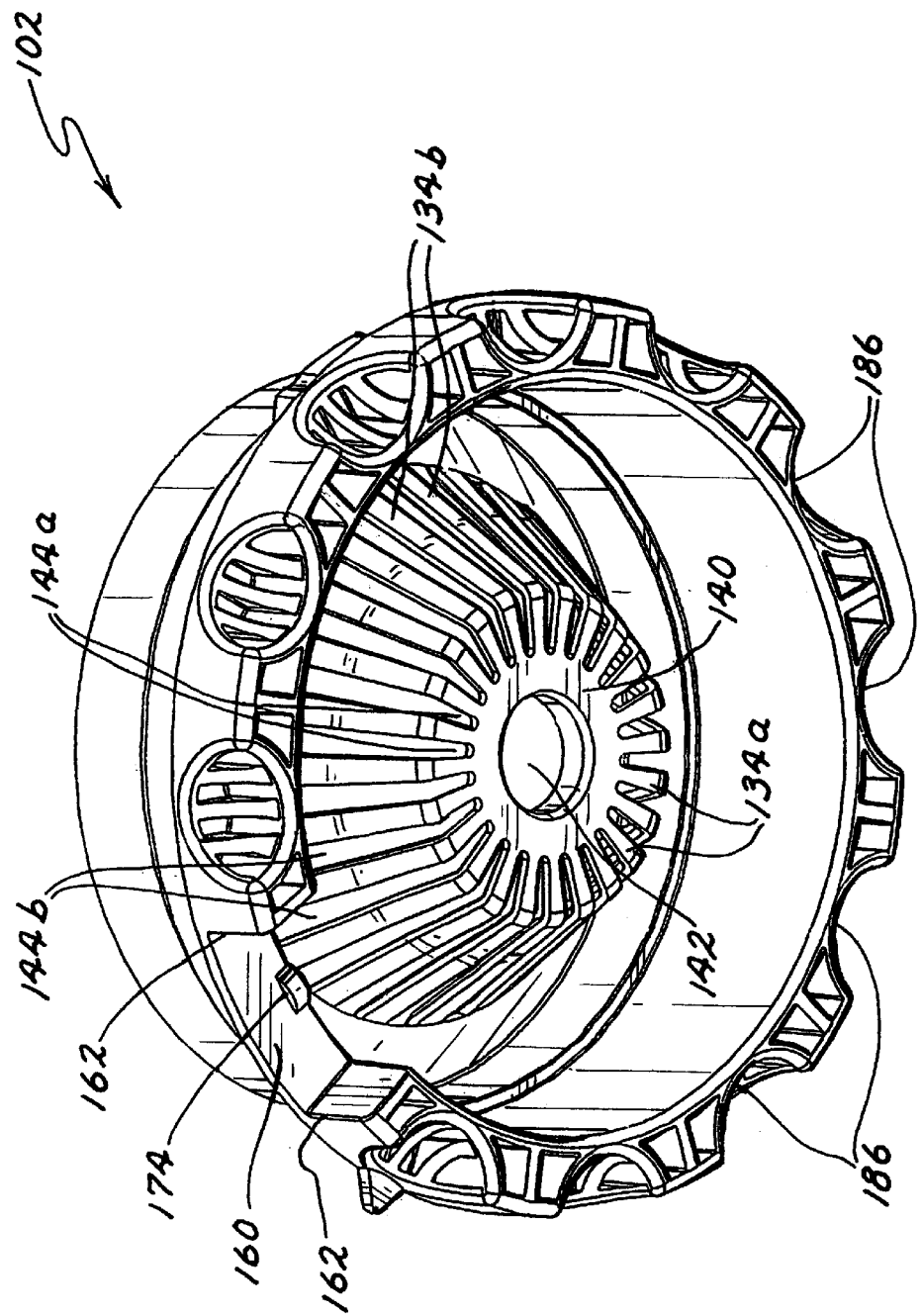
FIG. 5 is a perspective view of the exterior or air entrance side of the air inlet grate of the air inlet cover of FIG. 1.
Figure 6:
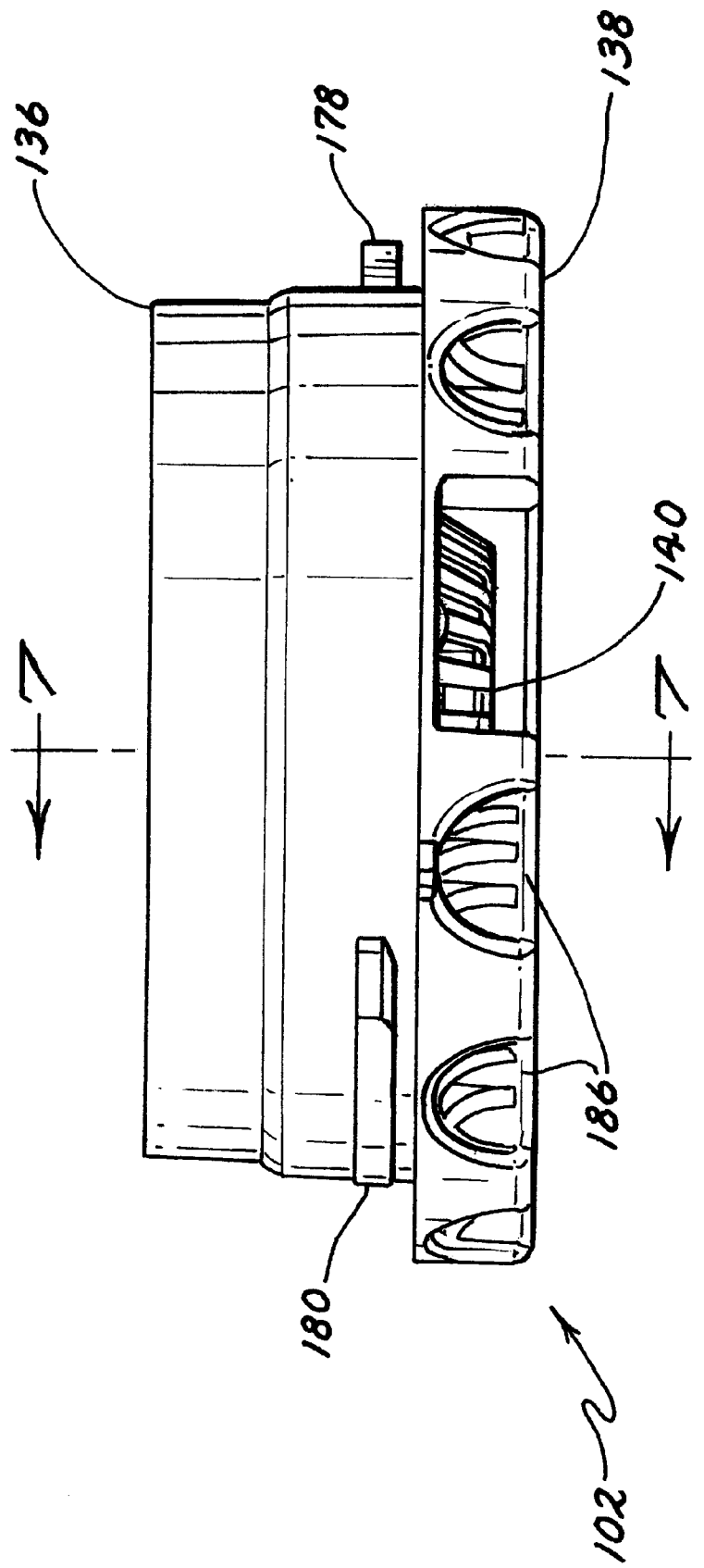
FIG. 6 is a side elevational view of the air inlet grate of FIG. 5.
Figure 7:
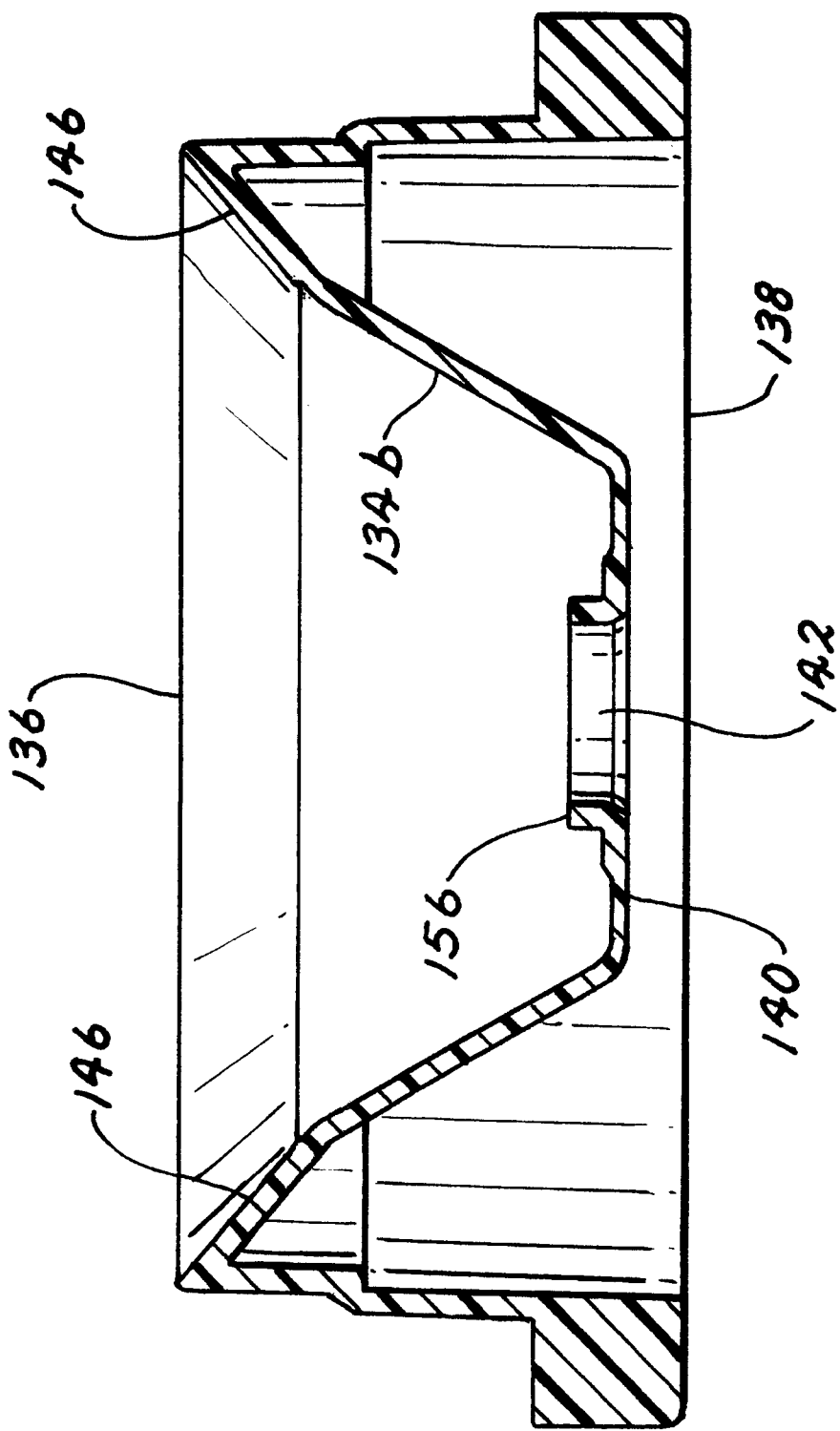
FIG. 7 is a cross-sectional view of the air inlet grate taken along line 7—7 of FIG. 6 with the spokes omitted for clarity.

Referring to FIGS. 5–9, air inlet grate 102 includes a series of spokes 134 defining the grate. The air grate allows the passage of air through cover 100 while at the same time providing a barrier to passage of objects that may contact the rotating impeller 106. Referring to FIG. 6, inlet grate 102 includes an exterior or air entrance side 138 through which air enters the cover and an interior or air exit side 136 through which air exits the cover as it enters blower housing 112. As best viewed in FIGS. 5 and 7, a central hub 140 is centrally located proximal to exterior side 138 in a plane generally parallel thereto. A series of radially disposed grate spokes 134a extend away from a hub opening 142 located at the center of central hub 140. Grate spokes 134a define a series of radially disposed grate orifices 144a that are interposed between the radially disposed grate spokes. A second series of grate spokes 134b extend generally outwardly and away from radially disposed grate spokes 134a. Grate spokes 134b, in the preferred embodiment, are actually extensions of radially disposed grate spokes 134a since air inlet grate 102 is an integrally molded plastic component. Grate spokes 134b define a series of grate orifices 144b that are interposed between grate spokes 134b. As shown in FIG. 7, Grate spokes 134b—at their upper end—terminate and partially support a pressure ring 146. Grate spokes 134a and 134b define a frusto-conical surface that is best viewed in FIG. 7. The frustum is bound by central hub 140 and pressure ring 146.

Figure 16:
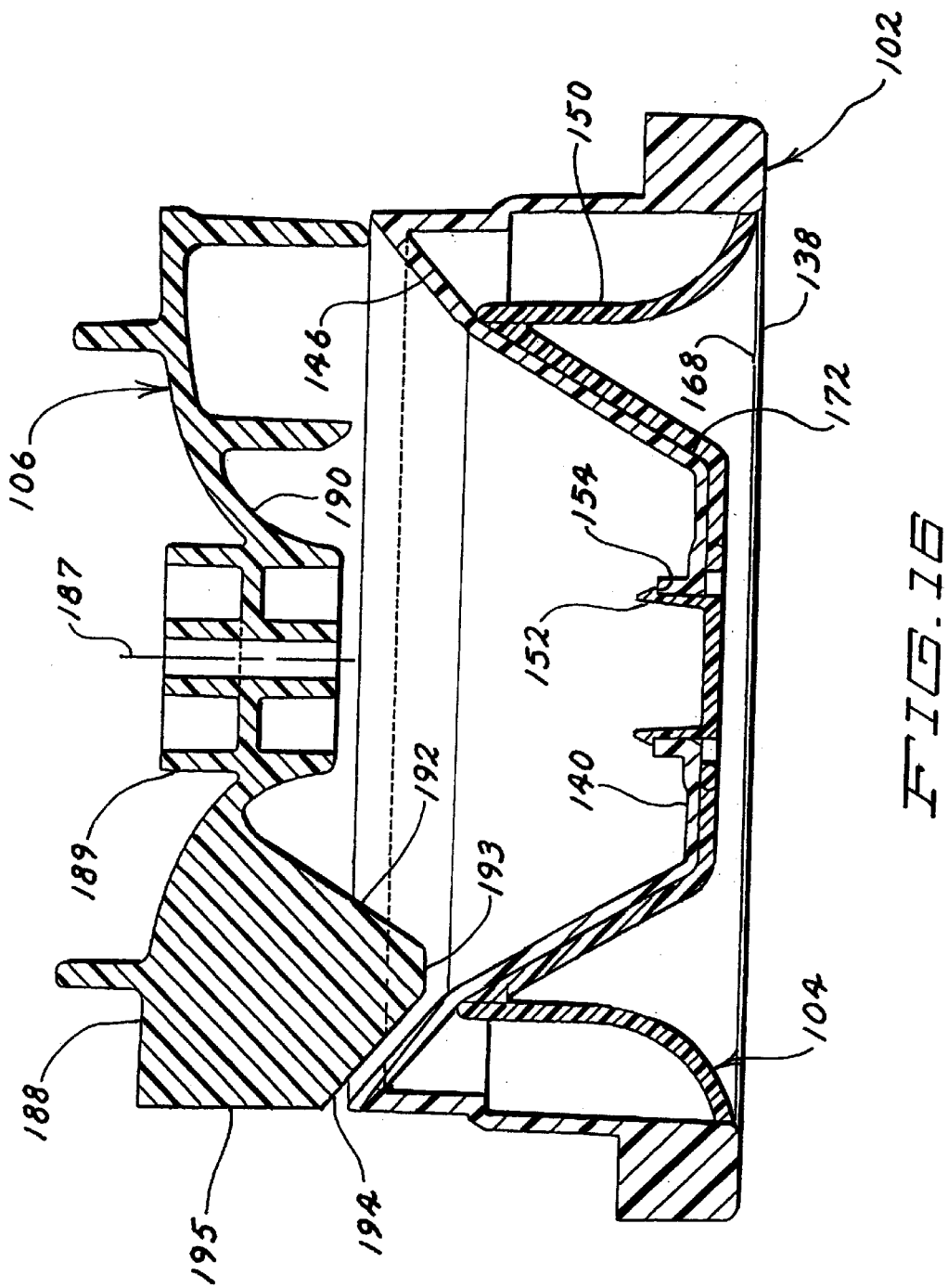
FIG. 16 is a cross-sectional view through the center of the preferred air inlet cover and impeller with the spokes omitted for clarity.

In the preferred embodiment, pressure ring 146 also forms a frusto-conical surface, a feature best viewed in FIGS. 7 and 16. The purpose of pressure ring 146 is to increase the efficiency of impeller 106 when air inlet grate 102 is engaged over air inlet opening 114 (i.e., when cover 100 is installed). When air inlet grate 102 is correctly installed, pressure ring 146 is positioned immediately adjacent to impeller 106 as shown in FIG. 16. When impeller 106 is rotating, it draws air through air grate 102 and air inlet 114 and expels it through air outlet 116. The close proximity of impeller 106 to pressure ring 146 reduces the amount of air that leaks or "spills over" from the high pressure side of the impeller blades to the low pressure side. By reducing the spillover of air, the efficiency of impeller 106 is increased. That is, by reducing spillover, the output air horsepower of blower/vac 110 is increased for a given motor (shaft) horsepower. Without pressure ring 146, impeller 106 would spill more air axially rather than discharging it radially as desired.

Figure 19:
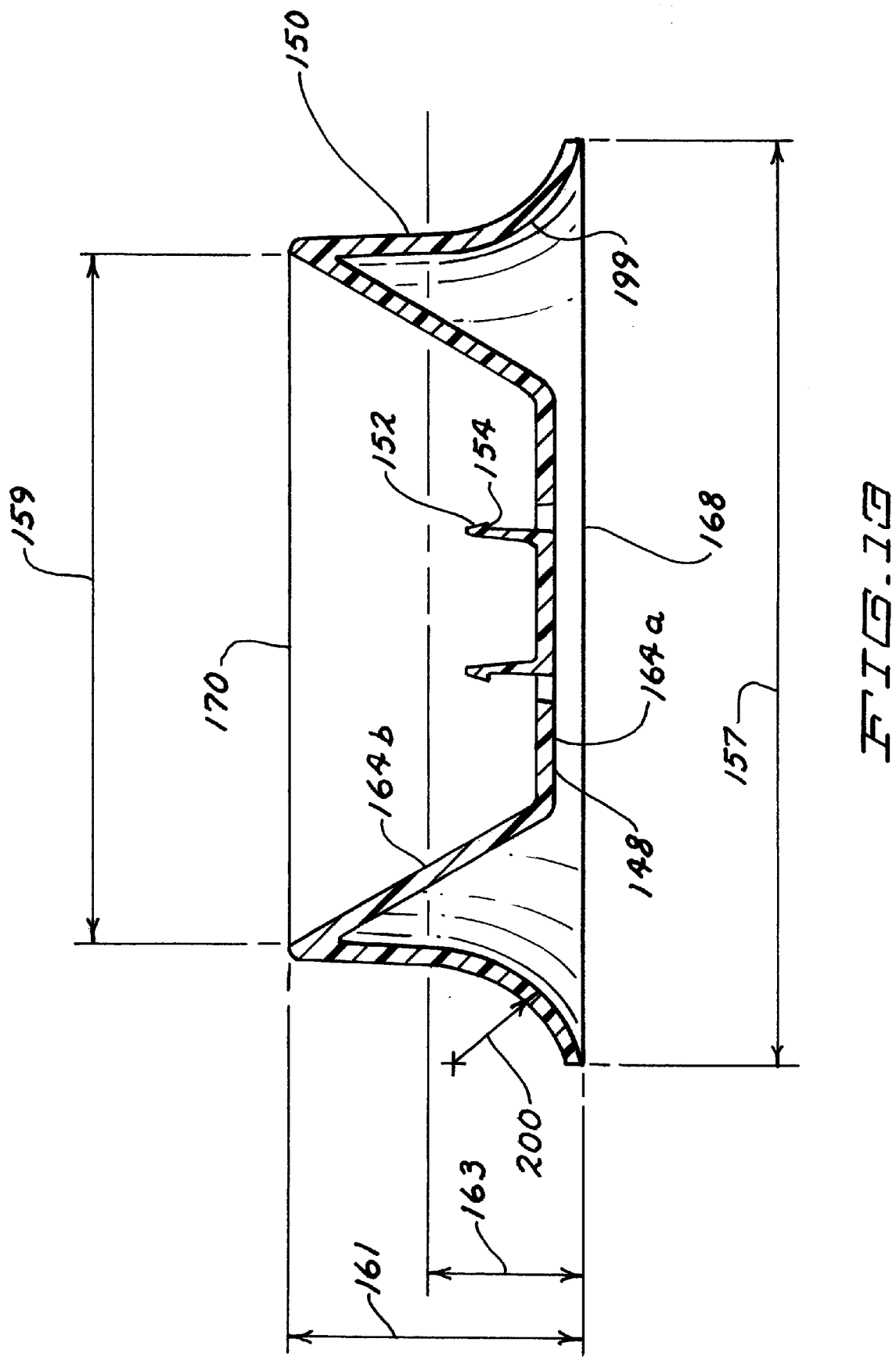
FIG. 19 is a side view of the impeller of FIG. 17.
Figure 18:
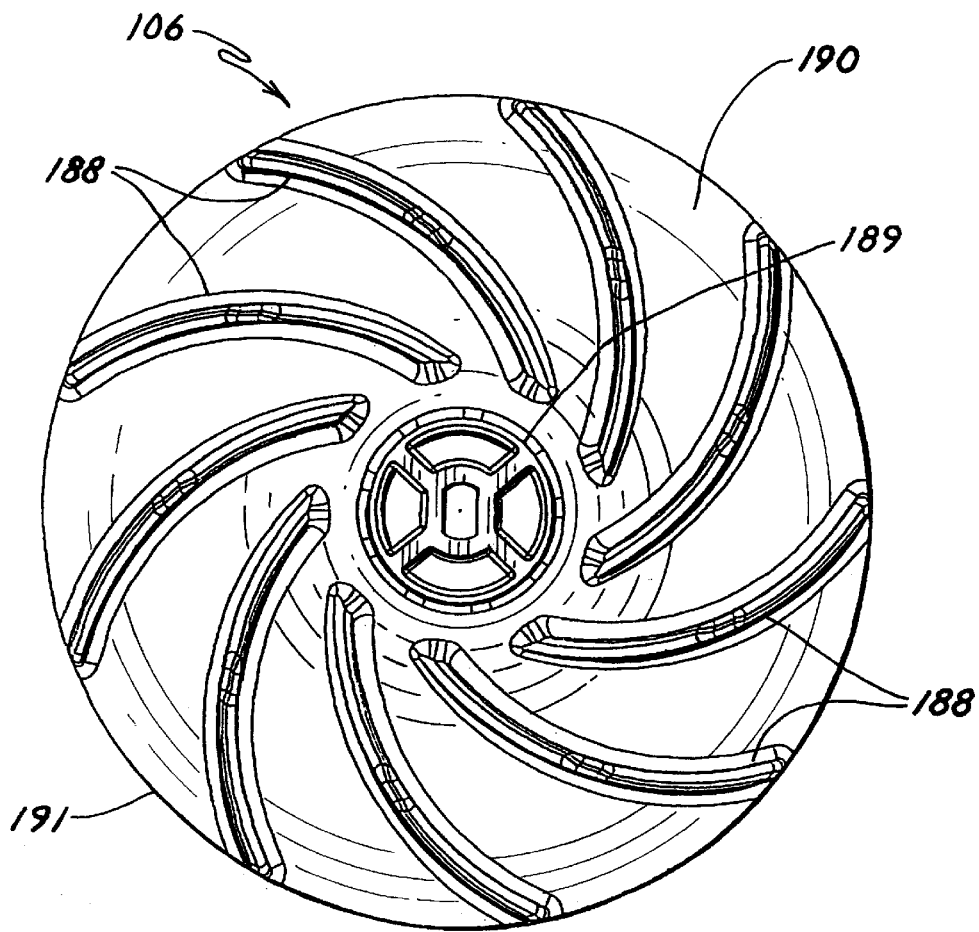
FIG. 18 is a bottom plan view of the impeller of FIG. 17.

Referring now to FIGS. 16, 18 and 19, impeller 106 comprises a hub 189 and a base 190. A perimeter 191 defines the outer edge of base 190. During operation, impeller 106 rotates about an axis of rotation 187 which is coaxial with the output shaft of motor 108. On the lower side of the impeller, extending downwardly in a generally perpendicular direction from base 190, is a plurality of integral, main impeller blades 188. Each main impeller blade 188 has a linear inner edge 192 which extends generally downwardly and away from a region near the junction of hub 189 and base 190 to a distal point. Each main impeller blade also has an outer edge 194 which extends generally upwardly and away from an innermost point, which is proximal to the distal point of inner edge 192, to an outermost point. In the preferred embodiment, an intermediate middle edge 193 terminates at the distal point of edge 192 and the innermost point of edge 194. Middle edge 193 lies in a plane that is generally perpendicular to axis of rotation 187. Each blade 188 includes a vertical edge 195 that extends downwardly from perimeter 191 to the outermost point of outer edge 194. As FIG. 18 demonstrates, each main impeller blade 188 radiates outwardly from the region near the junction of hub 189 and base 190 to perimeter 191 in a curvilinear manner.

As shown in FIG. 19, outer edge 194 is slightly convex in shape. In the context of FIG. 16 (i.e., as installed), outer edges 194 of main impeller blades 188 define a generally frusto-conical surface of revolution that is slightly offset but congruent to the frusto-conical surface defined by pressure ring 146. In the preferred embodiment, the nominal offset between fixed pressure ring 146 and rotating main impeller blades 188 is approximately 0.070 inches. This minimal offset improves the efficiency of the blower by reducing spillover as discussed above. In effect, impeller 106 is "sealed" to pressure ring 146.

Figure 17:
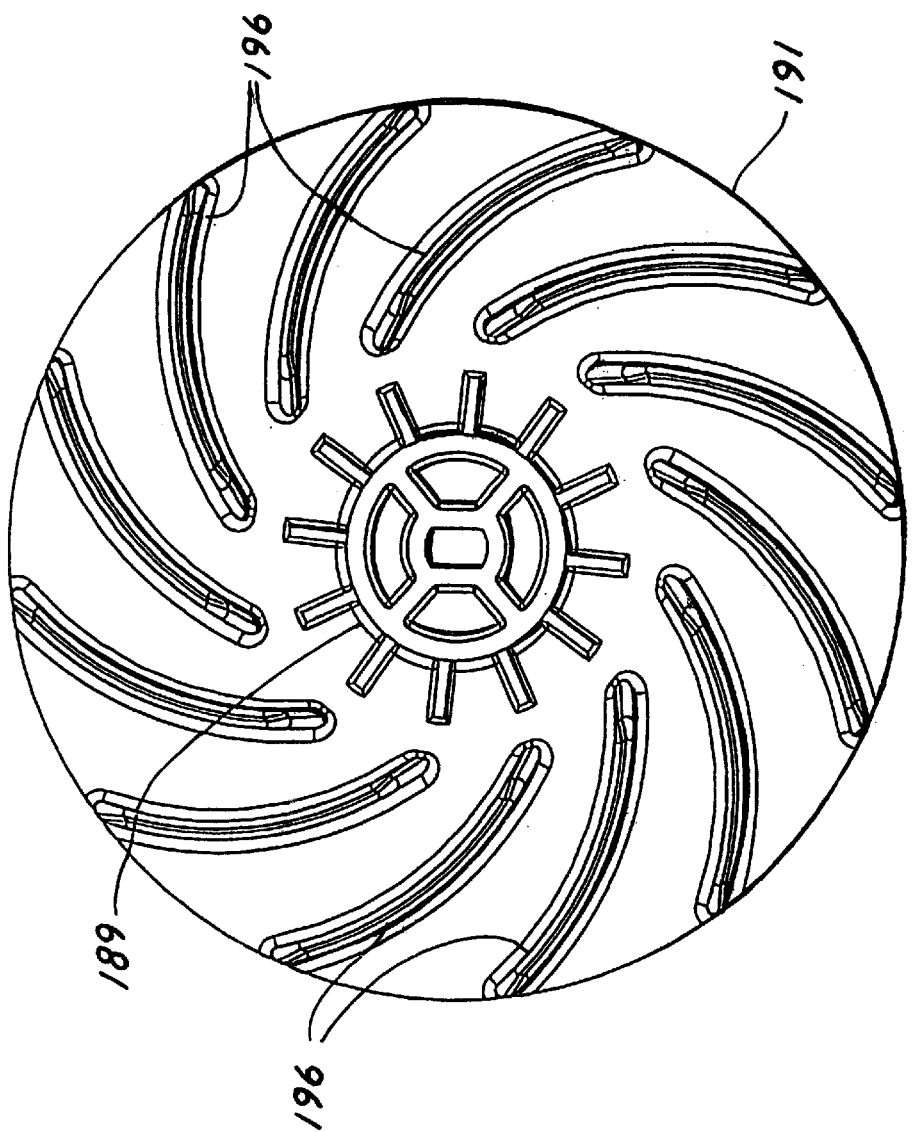
FIG. 17 is a top plan view of the impeller of the present invention.
Figure 19:
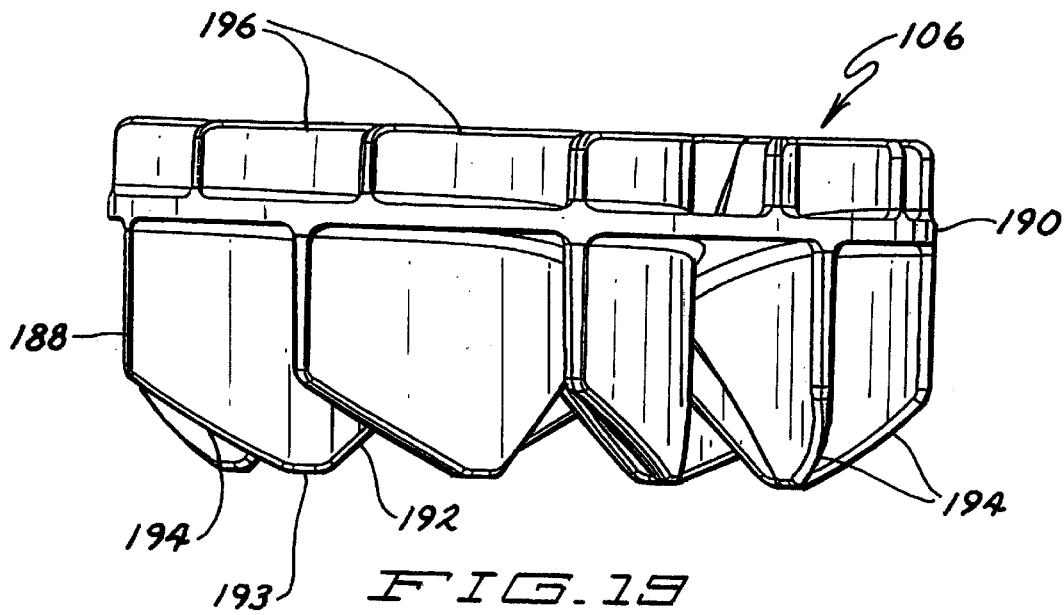

As shown in FIGS. 17 and 19, impeller 106 additionally includes a plurality of cooling impeller blades 196 located opposite main impeller blades 188. Blades 196 are similar to main impeller blades 188 in that, in a plan view, each cooling impeller blade 188 radiates outwardly to perimeter 191 in a curvilinear manner as shown in FIG. 17. Additionally, cooling impeller blades 196, like main impeller blades 188, also draw air into housing 112 and discharge it through air outlet 116. However, the cooling impeller blades draw air into housing 112 through a series of cooling vents 198 (shown in FIG. 2). Air drawn through cooling vents 198 then passes through a cavity (not shown) surrounding electric motor 108 before exiting through air outlet 116. Thus, cooling impeller blades 196 ensure continual cooling of electric motor 108 during operation of blower/vac 110. In the preferred embodiment, there are nine main impeller blades and twelve cooling impeller blades.

Figure 14:
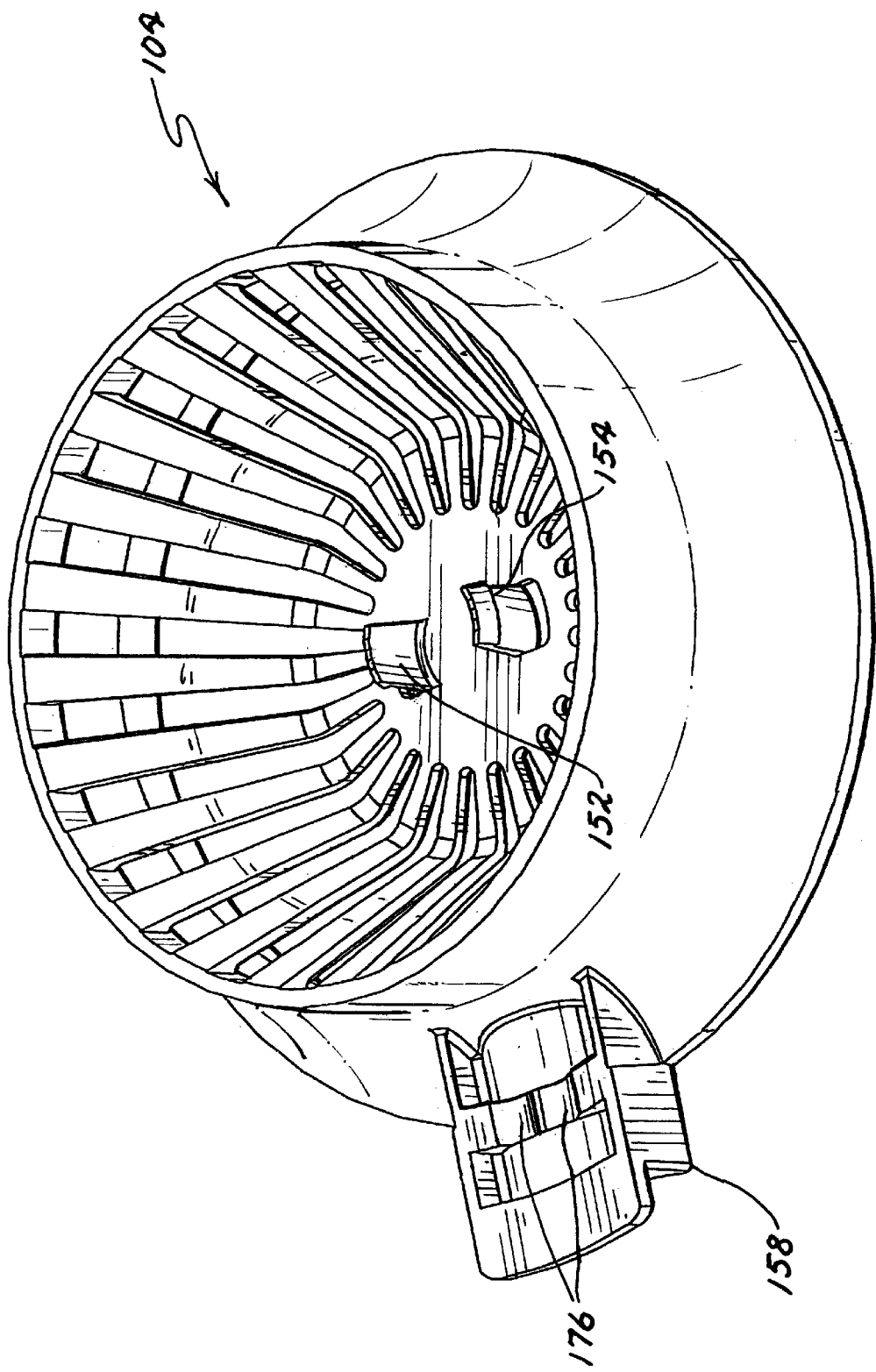
FIG. 14 is a perspective view of the interior or upper side of the choke member of FIG. 10.

Adjustable choke member 104 is adapted to "snap-fit" over air inlet grate 102. The choke member is shown in FIGS. 10—15. Referring particularly to FIG. 10, choke member 104 includes a hub region 148, a perimeter region 150, and an intermediate spoke region. For descriptive purposes, an exterior or "lower" side 168 is defined as shown in FIG. 12. An interior or "upper" side 170 is opposite thereto. Two clips 152 extend perpendicularly from hub region 148 as shown in FIGS. 13 and 14. Clips 152 include raised portions 154 at their distal ends. Clips 152 are spaced angularly apart from one another by 180 degrees. Clips 152 are also spaced radially from the center of hub 148 such that they may be inserted into the hub opening 142 of air inlet grate 102. Raised portions 154 engage a lip 156 (visible in FIGS. 7 and 8) on the interior side of hub opening 142, thus retaining choke member 104 axially relative to grate 102 (see FIGS. 7 and 8).

A choke lever 158 extends radially from choke member 104 as shown in FIGS. 10, 11, 12, 14, and 15. When choke member 104 is secured to air inlet grate 102 as described above, choke lever 158 nests within a choke lever opening 160 on air inlet grate 102 as shown in FIG. 1. Choke lever opening 160 is sized such that choke lever 158 can move back and forth between a pair of walls 162 as shown in FIG. 5. This back and forth movement permits choke member 104 to be pivotally rotated about hub opening 142 of air inlet grate 102. Choke lever 158 extends slightly beyond inlet grate 102 so that an adequate lever arm is provided for pivoting choke member 104. In the preferred embodiment, the total pivotal movement of choke member 104 is approximately 5 to 10 degrees.

Referring generally to FIG. 10, choke member 104 includes a series of radially disposed choke spokes 164a extending away from hub region 148. These spokes define a series of radially disposed choke orifices 166a interposed between radially disposed choke spokes 164a. A second series of choke spokes 164b extend generally upwardly and away from radially disposed choke spokes 164a. Choke spokes 164b are, in the preferred embodiment, actually extensions of the radially disposed choke spokes 164a since choke member 104 is an integrally molded element. Choke spokes 164b define a series of choke orifices 166b interposed between choke spokes 164b. Choke spokes 164a and 164b define a generally frusto-conical surface that is best viewed in FIG. 13. The frustum of this conical surface is bound by hub region 148 and side 170.

In order for choke member 104 to pivotally rotate about hub opening 142 of air inlet grate 102, the preferred cover is manufactured to provide a minimal positive clearance 172 between the choke and grate when assembled as shown in FIG. 16. Clearance 172 is exaggerated in FIG. 16 for descriptive purposes. In reality, choke hub region 148 and choke spokes 164 may be in contact with grate central hub 140 and grate spokes 134 respectively. However, any interference or resulting friction between the respective parts is not of sufficient magnitude to prevent rotation of choke member about hub opening 142. Choke member 104 is designed such that, when it is secured to air inlet grate 102, choke spokes 164b and choke orifices 166b are generally equal in length to grate spokes 134b and grate orifices 144b respectively. Similarly, radially disposed choke spokes 164a and radially disposed choke orifices 166a closely overlie radially disposed grate spokes 134a and radially disposed grate orifices 144a respectively. This relatively close fit of choke member 104 and its spokes and orifices in relation to the spokes and orifices of inlet grate 102 allows the operator to substantially block air inlet grate 102 when desired.

Once choke member 104 is secured to the air inlet cover, the choke member can be pivoted back and forth about hub opening 142. Referring to FIGS. 5 and 10, when choke member 104 is pivoted selectively to a first position, radially disposed choke spokes 164a obstruct the radially disposed grate orifices 144a, and choke spokes 164b obstruct grate orifices 144b. In this first position with the grate orifices generally obstructed by the choke spokes, the inlet area of cover 100 is substantially reduced. However, impeller blades 196 continue to draw air through cooling vents 198 as previously discussed. Nevertheless, the volume of air entering blower/vac 110 is substantially diminished. This reduction creates a corresponding decrease in the velocity and volume of the air stream exiting blower/vac 100 at air outlet 116.

When choke member 105 is pivoted to a second position opposite the first position, the radially disposed choke spokes 164a move away from the radially disposed grate orifices 144a, thus exposing radially disposed grate orifices 144a for passage of air through cover 100. Also, the movement of choke member 104 to the second position moves choke spokes 164b away from grate orifices 144b, thus exposing grate orifices 144b for passage of air through cover 100. Thus, in the second position, grate orifices 144 are aligned with choke orifices 166. With choke member 104 in its second position, the intake area of cover 100 is increased (i.e., the airflow through blower/vac 110 is maximized).

A detent protrusion 174 (shown in FIG. 5) is centrally located in choke lever opening 160 between the choke lever opening walls 162. Mating detent cavities 176 located on the upper side of the choke lever 158, as shown in FIG. 14, communicate with detent protrusion 174 such that choke member 104 is held in the first or second position and can only be moved out of position by a moderate amount of force. Accordingly, detent protrusion 174 and detent cavities 176 prevent inadvertent movement of choke lever 158 (and thus choke member 104) from its set position relative to air inlet grate 102.

Figure 8:
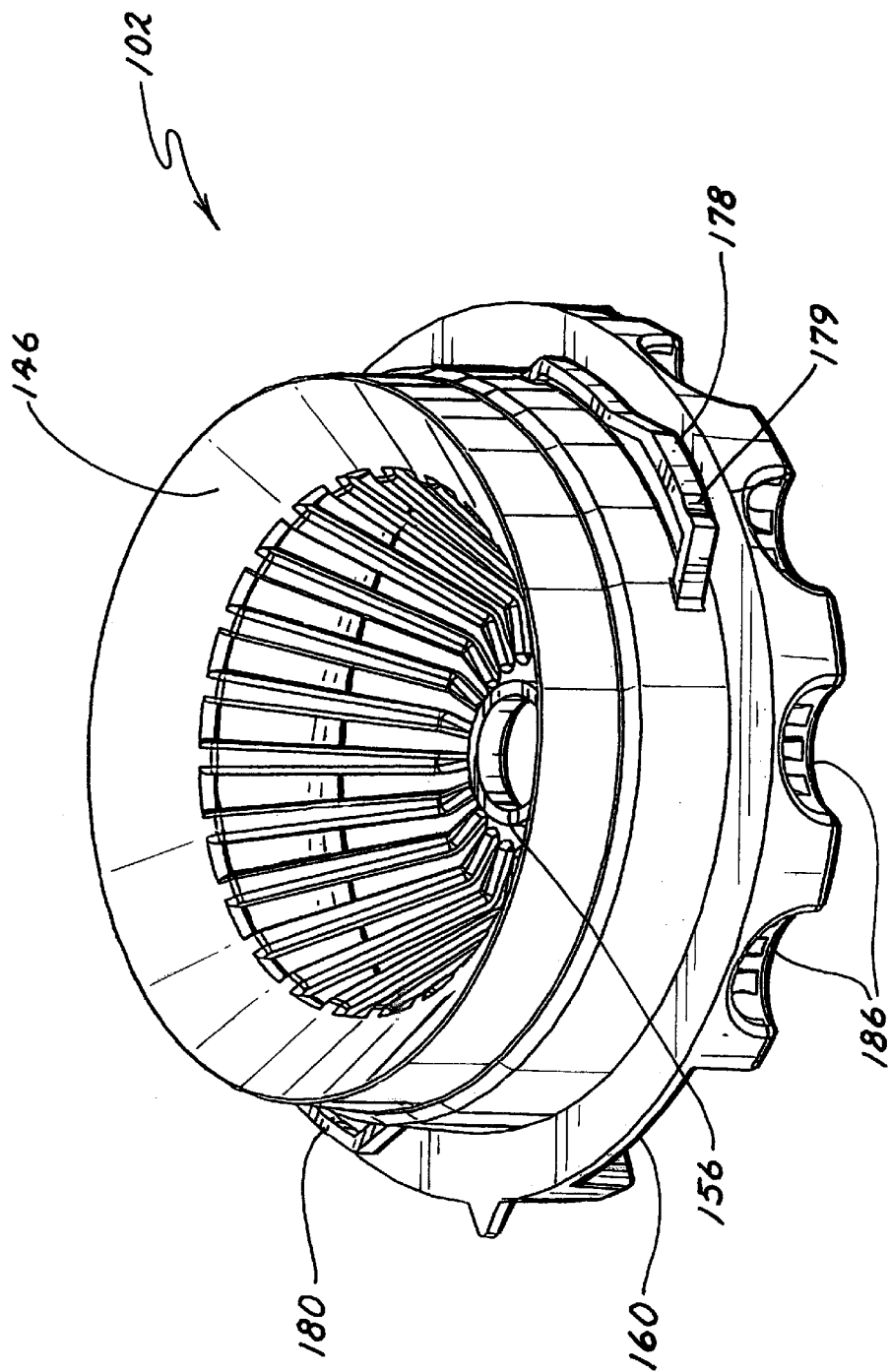
FIG. 8 is a perspective view of the interior or air exit side of the air inlet grate of FIG. 5.

A pair of male engagement members 178 and 180, visible in FIGS. 8 and 9, allow cover 100 to be removably engaged to air inlet opening 114. Male engagement members 178 and 180 are located approximately 180 degrees from one another on the perimeter of air inlet grate 102. As can be seen in FIG. 9, male engagement members 178 and 180 are different from one another. A pair of corresponding slots 182 and 184 in housing 112 are positioned at air inlet opening 114 and are best shown in FIG. 2A. Slot 182 is sized so as to accept only male engagement member 178. Slot 184 is sized so as to accept only male engagement member 180. Thus, air inlet cover 100 can only engage air inlet opening 114 in one orientation. In the preferred embodiment, air inlet cover 100 is engaged over air inlet opening 114 such that choke lever 158 is positioned to the left side (when viewed from above the blower) of blower/vac housing 112.

The safety interlock switch (not shown) is mounted in housing 112 at the rear of air inlet opening 114 proximal to slot 182. The safety interlock switch includes an actuator (not shown) that protrudes into the area immediately adjacent to slot 182. When air inlet cover 100 is engaged over air inlet opening 114, male engagement member 178 engages and depresses the actuator and closes the contacts in the switch. When cover 100 is removed from air inlet opening 114, male engagement member 178 moves away from the actuator. The biasing force of the actuator causes it to extend from its depressed position. When the actuator is extended, the contacts of the safety interlock switch are opened. The safety interlock switch is connected in series to the electrical on-off switch. Electric blower/vac motor 108 cannot be energized unless the contacts of the safety switch and the on-off switch are closed. Thus, if cover 100 is removed, the interlock switch contacts are open and the motor 108 cannot be energized even if the on-off switch contacts are closed.

Referring specifically to FIGS. 1 and 5, air inlet cover 100 also includes a series of quarter spherical indentations 186 spaced around the lower perimeter of the grate 102. In the preferred embodiment, a total of eleven quarter spherical indentations are spaced at 30 degree intervals about either side of choke lever opening 160. Quarter spherical indentations 186 are designed to comfortably accommodate the operator's fingers when grasping cover 100 to engage it over air inlet 114 or when removing it therefrom.

Now referring to FIGS. 2A, 8 and 9, Cover 100 (comprising both grate 102 and choke member 104) is retained over air inlet opening 114 as follows. Cover 100 is aligned with slots 182 and 184 so that the male engagement members 178 and 180 are aligned with the matching slots. Then cover 100 is pushed into air inlet opening 114 so that engagement members 178 and 180 pass through respective slots 182 and 184. When male engagement members 178 and 180 clear slots 182 and 184, cover 100 can then be rotated in a clockwise (looking at the cover from the bottom of the blower/vac) direction until a detent lock 179 (best shown in FIG. 8) rotationally retains cover 100 by engaging the biased actuator of the safety interlock switch (not shown). The locking force exerted by the detent system keeps cover 100 from unwanted rotation. However, the locking force can be overcome by a moderate rotational force exerted by the operator. Thus, when the operator chooses to remove cover 100, he simply needs to grasp quarter spherical indentations 186 and rotate it counter-clockwise until the detent retention force is overcome. Once the detent retention force is overcome, cover 100 can be further rotated until the male engagement members 178 and 180 are aligned with slots 182 and 184. At that point, cover 100 can be pulled axially away from air inlet opening 114 and removed from housing 112. It should be noted that when operated in vacuum mode, vacuum tube engagement members 132 on the upper end of upper tube 128 (see FIG. 4) engage air inlet opening 114 in a similar manner.

During use in the blower mode, air is drawn into blower housing 112 through air inlet cover 100 at air inlet opening 114. In order to maximize blower efficiency, optimal air flow into opening 114 is necessary. Thus, perimeter region 150 of choke member 104 defines a bell-mouthed entrance 199 best viewed in FIGS. 1 and 10. As further discussed below, bell-mouthed entrances are generally regarded to offer improved efficiency as compared to other entry configurations. From FIG. 13, bell-mouthed entrance 199 of the preferred embodiment is formed from the surface of revolution created by a bell-mouthed entrance radius 200 as it is rotated about an axis centrally located and perpendicular to both face 168 and face 170. Although the preferred embodiment incorporates bell-mouthed entrance 199 with movable choke member 104, an air inlet cover omitting the choke member but incorporating the bell-mouthed entrance into the cover itself is also within the scope of the present invention.

The general dimensions of the bell-mouthed entrance will now be described. Referring to FIG. 13, entrance 199 of the preferred embodiment transitions from an opening diameter 157, which measures between 4.5 and 5.0 inches, to a reduced diameter 159, which measures between 3.5 and 4.0 inches. Additionally, choke member 104 has a height 161 of approximately 1.5 inches. A transitional region 163 (i.e., the linear distance over which opening diameter 157 tapers to reduced diameter 159) measures about 0.65 inches. Finally, radius 200—which defines the bell-mouthed shape—measures between 0.5 and 1.0 inches.

The lower side of choke lever 158 comprises a channel 165 best viewed in FIGS. 1, 10, 12, and 15. Channel 165 is designed to provide adequate contact area so that the operator may, with one finger, comfortably move choke member 104 between its first and second position. That is, channel 165 permits the operator to more easily utilize lever 158 as a lever arm to pivot choke member 104.

Figure 15:
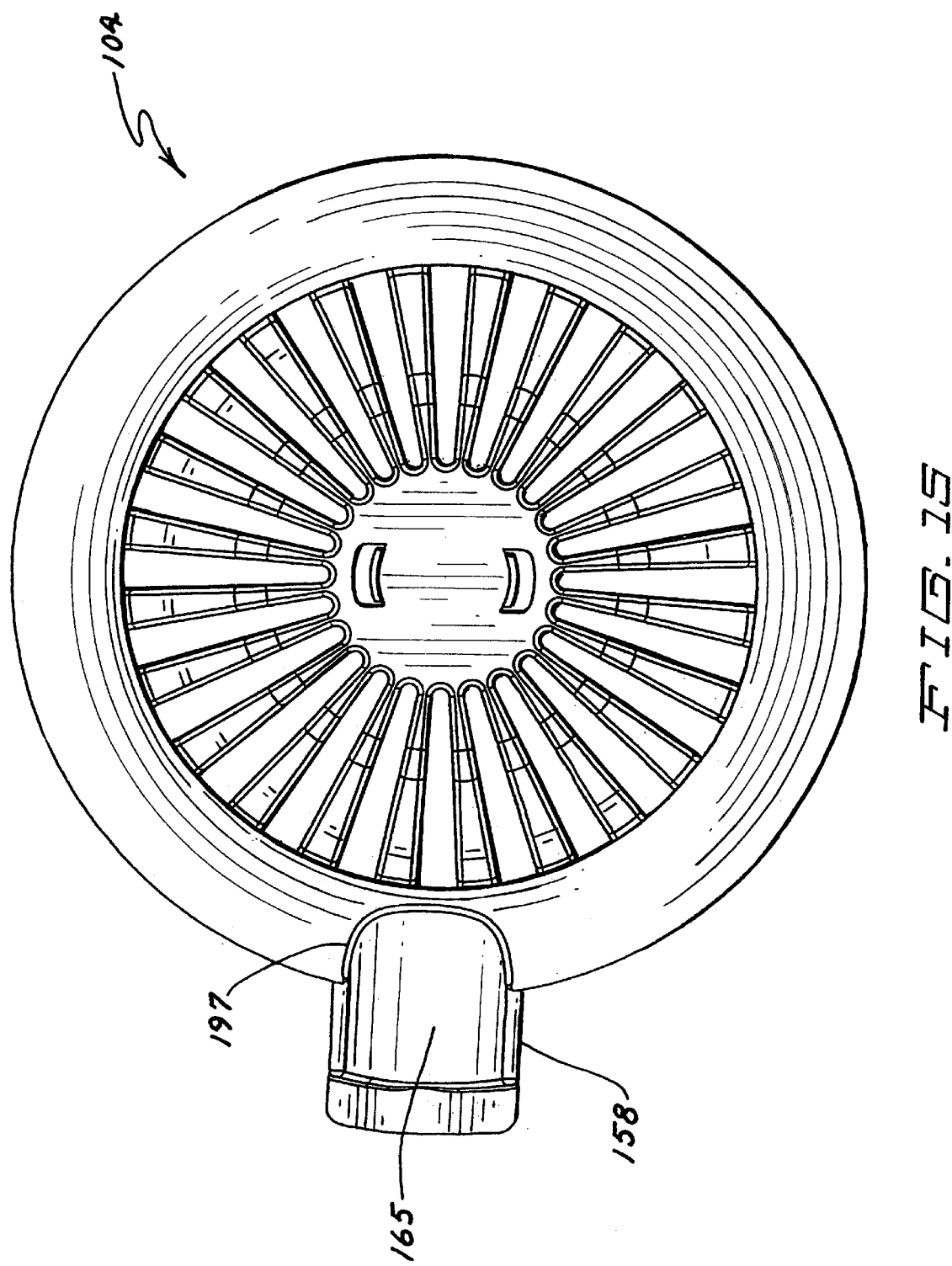
FIG. 15 is a plan view of the exterior or lower side of the choke member of FIG. 10.

To improve the efficiency of bell-mouthed entrance 199, sharp transitional features in and around the entrance are reduced. For example, exterior edge 168 of choke member 104 is substantially flush to exterior side 138 of air inlet grate 102 as shown in FIG. 16. Additionally, the intersection of channel 165 with bell-mouthed entrance 199 incorporates a generous chamfer 197 as shown in FIGS. 10 and 15. These features reduce air flow interruptions in and around bell-mouthed opening 199. By creating a smooth air flow pattern into the bell-mouthed entrance, the air flow rate through blower/vac inlet 114 is maximized.

Another benefit of the preferred entrance configuration is its minimal pressure loss characteristics. Because the pressure loss attributable to a specific entrance configuration is proportional to its energy loss, reducing pressure loss will improve entrance efficiency. While any entrance configuration will suffer some pressure loss as air accelerates into the entrance, it is generally perceived that the loss associated with the bell-mouthed entrance is lower in comparison. This minimal pressure loss, combined with the smooth air flow attributes described above, results in increased efficiency. This increased efficiency, in turn, allows a greater output air horsepower for a given motor horsepower.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the claimed apparatus, and equivalents thereof.

We claim:

1. An air moving apparatus, comprising:
   a. a housing, the housing including an air inlet opening and an air outlet;
   b. a motor, the motor being operatively connected to the housing;
   c. an impeller, the impeller being affixed to an output shaft of the motor, the impeller drawing air through the air inlet opening and discharging air through the air outlet;
   d. an air grate, the air grate being mounted over the air inlet opening;
   e. a pressure ring, the pressure ring being mounted over the air inlet opening; and
   f. an adjustable choke member permitting adjustment of the air flow rate through the air grate and the pressure ring wherein the choke member is concentrically and pivotally engaged to the air grate and wherein the choke member further comprises an integrally formed bell-mouthed entrance.

2. The air moving apparatus of claim 1, wherein the pressure ring is integrally formed with the air grate.

3. The air moving apparatus of claim 1, wherein the air grate is removably mounted over the air inlet opening.

4. An air inlet cover for covering an air inlet opening of a portable blower/vac, wherein the air inlet cover comprises:
   a. an air grate, the air grate being mounted over the air inlet opening;
   b. a pressure ring, the pressure ring being mounted over the air inlet opening; and
   c. a bell-mouthed entrance, wherein the bell-mouthed entrance is formed integrally with an adjustable choke member that is mounted concentrically on the air grate.

5. The air inlet cover of claim 4, wherein the pressure ring is integrally formed with the air grate.

6. The air inlet cover of claim 4, wherein the air inlet cover is removably mounted over the air inlet opening.

7. The air inlet cover of claim 4, wherein the bell-mouthed entrance has an opening diameter between 4.5 inches and 5.0 inches and tapers to a reduced diameter between 3.5 inches and 4.0 inches.

8. The air inlet cover of claim 7, wherein the bell-mouthed entrance is defined by a bell-mouthed entrance radius measuring between 0.5 inches and 1.0 inches.

9. The air inlet cover of claim 4, wherein the choke member is pivotally mounted to the air grate.

10. The air inlet cover of claim 9, wherein the choke member further comprises a choke lever extending radially outward from an outer perimeter of the choke member wherein the choke lever provides an operator with a lever arm for pivoting the choke member between a first and a second position.

11. The air inlet cover of claim 10, wherein the choke lever includes detent means for retaining the choke lever and the choke member in either the first or the second position once the desired position has been selected by the operator.

12. A portable blower/vac comprising:
   a. a housing, the housing including an air inlet opening and an air outlet;
   b. a motor, the motor being operatively connected to the housing;
   c. an impeller, the impeller being affixed to an output shaft of the motor, the impeller drawing air through the air inlet opening and discharging air through the air outlet;
   d. an air grate, the air grate being mounted over the air inlet opening;
   e. a pressure ring, the pressure ring being mounted over the air inlet opening;
   f. an adjustable choke member permitting adjustment of the air flow rate through the air grate and the pressure ring wherein the choke member is concentrically and pivotally engaged to the air grate and wherein the choke member further comprises a bell-mouthed entrance; and
   g. a choke lever extending radially outward from an outer perimeter of the choke member wherein the choke lever provides an operator with a lever arm for pivoting the choke member between a first and a second position, wherein the choke lever includes detent means for retaining the choke lever and the choke member in either the first or the second position once the desired position has been selected by the operator.

13. The portable blower/vac of claim 12, wherein the pressure ring is integrally formed with the air grate.

14. The portable blower/vac of claim 13, wherein the air grate is removably mounted over the air inlet opening.

15. A portable blower/vac comprising:
   a. a housing, the housing including an air inlet opening and an air outlet;
   b. a motor, the motor being operatively connected to the housing;
   c. an impeller, the impeller being affixed to an output shaft of the motor, the impeller having an axis of rotation coaxial with the output shaft of the motor, the impeller drawing air through the air inlet opening and discharging air through the air outlet; and
   d. an air inlet cover comprising:
      i. an air entrance side through which air enters the inlet cover;
      ii. an air exit side through which air exits after flowing through the inlet cover;
      iii. a bell-mouthed entrance on the air entrance side of the inlet cover wherein the bell-mouthed entrance is formed integrally with an adjustable choke member; and
      iv. a pressure ring on the air exit side of the inlet cover for increasing the efficiency of the impeller when the air inlet cover is engaged over the air inlet opening and wherein the pressure ring defines a generally frusto-conical surface.

16. The portable blower/vac of claim 15, wherein the air inlet cover is removably mounted over the air inlet opening.

17. The portable blower/vac of claim 15, wherein the motor is electrically powered.

* * * * *